Patented Mar. 21, 1950

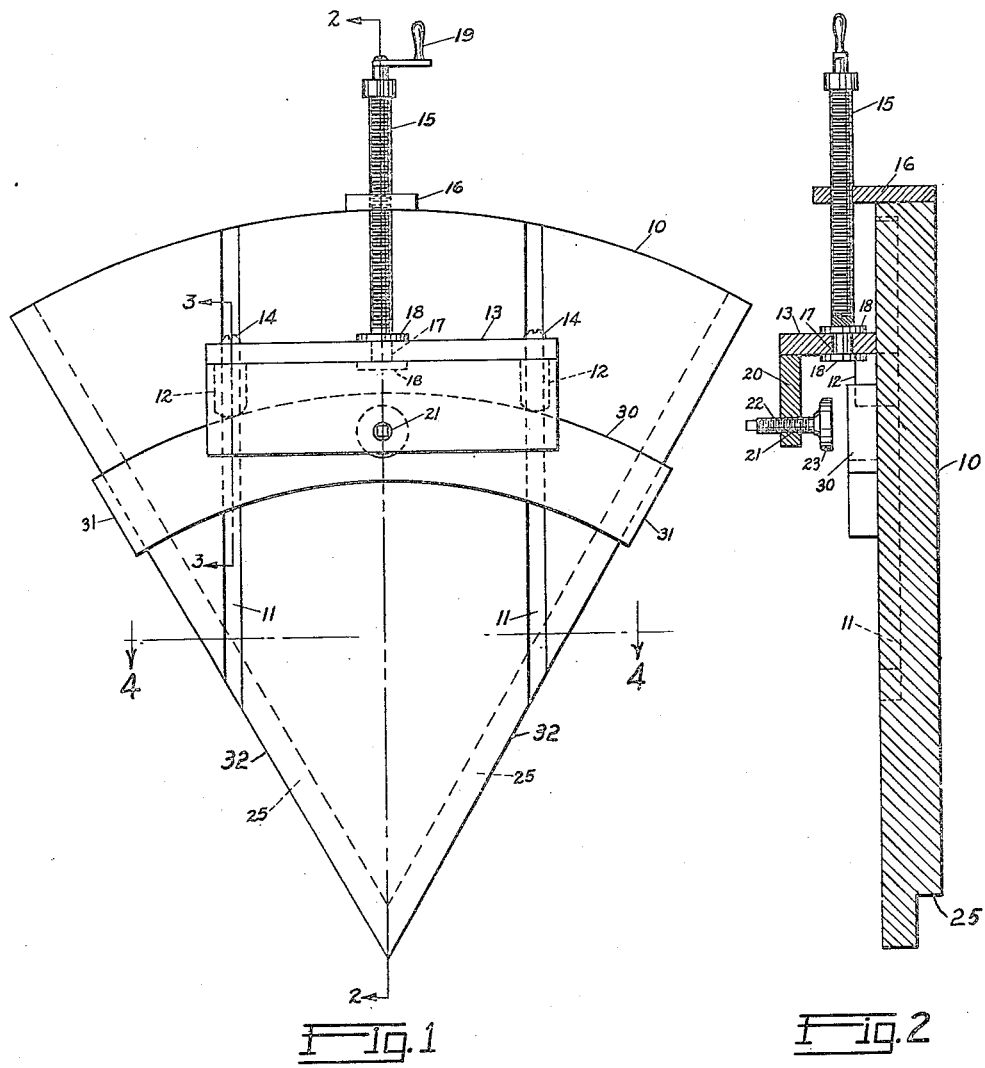
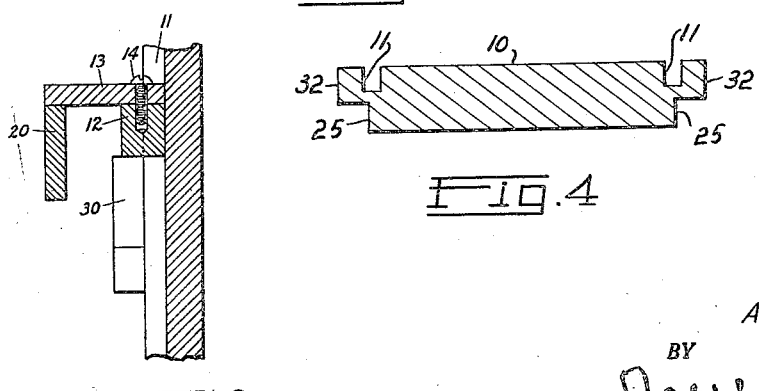
Fig. 1  Fig. 2  Fig. 3  Fig. 4
INVENTOR.
Aubrey C. Tucker
BY Ralph L. Chappell
ATTORNEY.

2,500,967

UNITED STATES PATENT OFFICE 2,500,967

WORK HOLDER

Aubrey C. Tucker, Howard Beach, N. Y.

Application September 27, 1945, Serial No. 619,001

26 Claims. (Cl. 51—217)

(Granted under the act of March 3, 1883, as amended April 30, 1928; 370 O. G. 757)

This invention relates to a fixture for holding packing-ring sectors or other sector-shaped objects while machining the butt ends thereof.

In the past, in the manufacture of carbon or other packing rings of annular shape, the annular segments comprising the ring were shaped by hand, a practice often resulting in imperfect shapes and butt ends that were not sufficiently matched to form a perfect seal.

The device presented in this application is a fixture that can be adjusted to hold annular sectors of a range of radii, and that will enable the butt ends to be sanded so precisely as to make them fluid tight when used as a seal on a rotor. This fixture also allows rapid insertion and removal of annular sectors, thereby resulting in a substantial saving of time in their manufacture.

An object of this invention is to provide a fixture for holding sector-shaped objects, said fixture being portable, easily adjusted and simple in construction.

Another object is to provide a fixture for holding sectors or other shaped objects in position for the performance of precise machine operations thereon.

Further objects and advantages of this invention, as well as its construction, arrangement and operation will be apparent from the following description and claims in connection with the accompanying drawing, in which Fig. 1 is a top plan view of the fixture;

Fig. 2 is a side view of the fixture in vertical section along the line 2—2 of Fig. 1;

Fig. 3 is a partial vertical section along the line 3—3 of Fig. 1; and

Fig. 4 is a section along the line 4—4 of Fig. 1.

The fixture base 10 is preferably of a sector shape. Recessed in the top surface of said base 10 are a plurality of channels 11, which are parallel to a line running from the apex of the sector through the mid point of the arc of the sector. Within the channels 11 are mounted slidable stops 12, which are attached to a plate 13 by means of screws 14. Said plate 13 is disposed at an angle to said base 10. Movement of the plate 13 and the stops 12 is achieved by means of a screw 15, which is received threadedly by the lug 16, located medial the arc of the sector-shaped base 10. Lug 16 is affixed to the base 10 by welding or any other suitable means. One end of the screw 15 is rotatable freely in the plate 13, where it is received by bore 17 and held in place by means of flanges 18. A handle 19 is provided to facilitate turning of screw 15.

A selected edge of the plate 20 is welded or otherwise affixed to the face of plate 13 distal handle 19, said plate 20 being disposed at an angle to said plate 13. A threaded bore 21 in said plate 20 mounts a screw 22, said screw 22 having a clamping element 23 at the end thereof proximate the base 10.

Suitable guide edges such as straight-edges 32 and channels 25 form sides of base 10 and act as guides for the machine tools used. The projection of said straight edges 32 beyond the bases of the channels 25 affords clearance for the device above the work bench.

While Fig. 1 shows a sector of 60°, it is to be understood that a sector including any number of degrees can be used. For example, angular size may depend on the number of annular sectors that form a complete packing ring, viz., four sectors of 90°, six sectors of 60°, eight sectors of 45°, or other desired combination.

In the operation of the device, the packing-ring sector 30 is placed on the base 10 against the stops 12, which have been located by turning the screw 15 by means of handle 19. With the butt ends 31 of sector 30 properly aligned with the sides 32 of the base 10, the sector 30 is clamped in place by turning screw 22. A sanding machine is then applied to the butt ends 31, using the sides 32 of the base 10, or the channels 25, as guiding means until the butt ends 31 are properly and accurately finished.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A fixture comprising a sector-shaped base, channels in said base, said channels being parallel to a line running from the apex to the midpoint of the arcuate side of said base, an upstanding lug located centrally on the arcuate side of said base, a screw in threaded engagement with said lug and passing therethrough, a vertical plate carried on the end of said screw, a horizontal plate on said vertical plate, stops engaged slidably in said channels and fixed to said vertical plate, and a clamping element depending from said horizontal plate.

2. A fixture comprising a sector-shaped base, channels in said base, said channels being parallel to a line extending from the apex to the midpoint of the arcuate side of said base, a vertical lug fixed to said base at said midpoint, said lug having a threaded bore, a screw in said bore, said screw extending along said line, a vertical plate carried on the end of said screw, said screw being rotatable freely in said vertical plate, stops engaged slidably in said channels, said stops being fixed to said vertical plate, a horizontal plate on said vertical plate, said horizontal plate having a vertical, threaded bore, a screw in said bore, said screw having a clamping surface at its lower end, and a channel on the lower side of each of the straight sides of said base.

3. A fixture comprising a base, parallel channels in said base, an upstanding lug located on an edge of said base medial said channels, a screw in threaded engagement with said lug and passing therethrough, a vertical plate carried on the end of said screw, a horizontal plate on said vertical plate, stops engaged slidably in said channels and fixed to said vertical plate, and a clamping element depending from said horizontal plate.

4. A fixture comprising a base, parallel channels in said base, a vertical lug fixed to an edge of said base medial said channels, said lug having a threaded bore, a screw in said bore, said screw extending parallel said channels, a vertical plate carried on the end of said screw, said screw being freely rotatable in said vertical plate, stops engaged slidably in said channels, said stops being fixed to said vertical plate, a horizontal plate on said vertical plate, said horizontal plate having a vertical threaded bore, a screw in said bore, said screw having a clamping surface at its lower end, and channels in the nether portions of selected edges of said base.

5. A fixture comprising a base, a plurality of parallel channels in said base, an upstanding lug located on an edge of said base and between two of said channels, a screw in threaded engagement with said lug and passing therethrough, a vertical plate carried on the end of said screw, a horizontal plate on said vertical plate, stops engaged slidably in said channels and fixed to said vertical plate, and a clamping element depending from said horizontal plate.

6. A fixture comprising a base, a plurality of parallel channels in said base, a vertical lug fixed to an edge of said base and between two of said channels, said lug having a threaded bore, a screw in said bore, said screw extending parallel said channels, a vertical plate carried on the end of said screw, said screw being rotatable freely in said vertical plate, stops engaged slidably in said channels, said stops being fixed to said vertical plate, a horizontal plate on said vertical plate, said horizontal plate having a vertical threaded bore, a screw in said bore, said screw having a clamping surface at its lower end, and channels in the nether portions of selected edges of said base.

7. A fixture comprising a base, a plurality of parallel channels in said base, an upstanding lug located on an edge of said base and between two of said channels, a screw in threaded engagement with said lug and passing therethrough, a first plate disposed at an angle to said base and carried on the end of said screw, a second plate disposed at an angle to said first plate and secured thereto, stops engaged slidably in said channels and fixed to said first plate, and a clamping element depending from said second plate.

8. A fixture comprising a base, a plurality of parallel channels in said base, a vertical lug fixed to an edge of said base and between two of said channels, said lug having a threaded bore, a screw in said bore, said screw extending parallel said channels, a first plate disposed at an angle to said base and carried on the end of said screw, said screw being freely rotatable in said first plate, stops engaged slidably in said channels, said stops being fixed to said first plate, a second plate mounted on said first plate at an angle thereto, said second plate having a threaded bore, a screw in said bore, said screw having a clamping surface at its nether end, and channels in the nether portions of selected edges of said base.

9. A fixture comprising a base, a plurality of parallel channels in said base, an upstanding lug located on an edge of said base and between two of said channels, a screw in threaded engagement with said lug and passing therethrough, a first plate disposed at an angle to said base and carried on the end of said screw, a second plate disposed at an angle to said first plate and secured thereto, a stop engaged slidably in at least one of said channels and fixed to said first plate, and a clamping element depending from said second plate.

10. A fixture comprising a base, a plurality of parallel channels in said base, a vertical lug fixed to an edge of said base and between two of said channels, said lug having a threaded bore, a screw in said bore, said screw extending parallel said channels, a first plate disposed at an angle to said base and carried on the end of said screw, said screw being rotatable freely in said first plate, a stop engaged slidably in at least one of said channels and fixed to said first plate, a second plate mounted on said first plate at an angle thereto, said second plate having a threaded bore, a screw in said bore, said screw having a clamping surface at its nether end, and channels in the nether portions of selected edges of said base.

11. A fixture comprising a base, selected edges of said base defining selected radii of a circle, parallel channels in said base, an upstanding lug located on an edge of said base medial said channels, a screw in threaded engagement with said lug and passing therethrough, a vertical plate carried on the end of said screw, a horizontal plate on said vertical plate, stops engaged slidably in said channels and fixed to said vertical plate, and a clamping element depending from said horizontal plate.

12. A fixture comprising a base, selected edges of said base defining selected radii of a circle, parallel channels in said base, a vertical lug fixed to an edge of said base medial said channels, said lug having a threaded bore, a screw in said bore, said screw extending parallel said channels, a vertical plate carried on the end of said screw, said screw being rotatable freely in said vertical plate, stops engaged slidably in said channels, said stops being fixed to said vertical plate, a horizontal plate on said vertical plate, said horizontal plate having a vertical threaded bore, a screw in said bore, said screw having a clamping surface at its nether end, and channels in the nether portions of selected edges of said base.

13. A fixture comprising a base, selected edges of said base defining selected radii of a circle, a plurality of parallel channels in said base, an upstanding lug located on an edge of said base and between two of said channels, a screw in threaded engagement with said lug and passing therethrough, a vertical plate carried on the end of said screw, a horizontal plate on said vertical plate, stops engaged slidably in said channels and fixed to said vertical plate, and a clamping element depending from said horizontal plate.

14. A fixture comprising a base, selected edges of said base defining selected radii of a circle, a plurality of parallel channels in said base, a vertical lug fixed to an edge of said base and between two of said channels, said lug having a threaded bore, a screw in said bore, said screw extending parallel said channels, a vertical plate carried on the end of said screw, said screw being rotatable freely in said vertical plate, stops engaged slidably in said channels, said stops being fixed to said vertical plate, a horizontal plate on said vertical plate, said horizontal plate having a vertical threaded bore, a screw in said bore, said screw having a clamping surface at its lower end, and channels in the nether portions of selected edges of said base.

15. A fixture comprising a base, selected edges of said base defining selected radii of a circle, a plurality of parallel channels in said base, an upstanding lug located on an edge of said base and between two of said channels, a screw in threaded engagement with said lug and passing therethrough, a first plate disposed at an angle to said base and carried on the end of said screw, a second plate disposed at an angle to said first plate and secured thereto, stops engaged slidably in said channels and fixed to said first plate, and a clamping element depending from said second plate.

16. A fixture comprising a base, selected edges of said base defining selected radii of a circle, a plurality of parallel channels in said base, a vertical lug fixed to an edge of said base and between two of said channels, said lug having a threaded bore, a screw in said bore, said screw extending parallel said channels, a first plate disposed at an angle to said base and carried on the end of said screw, said screw being rotatable freely in said first plate, stops engaged slidably in said channels, said stops being fixed to said first plate, a second plate mounted on said first plate at an angle thereto, said second plate having a threaded bore, a screw in said bore, said screw having a clamping surface at its lower end, and channels in the nether portions of selected edges of said base.

17. A fixture comprising a base, selected edges of said base defining selected radii of a circle, a plurality of parallel channels in said base, an upstanding lug located on an edge of said base and between two of said channels, a screw in threaded engagement with said lug and passing therethrough, a first plate disposed at an angle to said base and carried on the end of said screw, a second plate disposed at an angle to said first plate and secured thereto, a stop engaged slidably in at least one of said channels and fixed to said first plate, and a clamping element depending from said second plate.

18. A fixture comprising a base, selected edges of said base defining selected radii of a circle, a plurality of parallel channels in said base, a vertical lug fixed to an edge of said base and between two or said channels, said lug having a threaded bore, a screw in said bore, said screw extending parallel said channels, a first plate disposed at an angle to said base and carried on the end of said screw, said screw being freely rotatable in said first plate, a stop in at least one of said channels and fixed to said first plate, a second plate mounted on said first plate at an angle thereto, said second plate having a threaded bore, a screw in said bore, said screw having a clamping surface at its lower end, and channels in the nether portions of selected edges of said base.

19. A fixture comprising a base, selected edges of said base defining predetermined included configurations, parallel channels in said base, an upstanding lug located on an edge of said base medial said channels, a screw in threaded engagement with said lug and passing therethrough, a vertical plate carried on the end of said screw, a horizontal plate on said vertical plate, stops engaged slidably in said channels and fixed to said vertical plate, and a clamping element depending from said horizontal plate.

20. A fixture comprising a base, selected edges of said base defining predetermined included configurations, parallel channels in said base, a vertical lug fixed to an edge of said base medial said channels, said lug having a threaded bore, a screw in said bore, said screw extending parallel said channels, a vertical plate carried on the end of said screw, said screw being rotatable freely in said vertical plate, stops engaged slidably in said channels, said stops being fixed to said vertical plate, a horizontal plate on said vertical plate, said horizontal plate having a vertical threaded bore, a screw in said bore, said screw having a clamping surface at its lower end, and channels in the nether portions of selected edges of said base.

21. A fixture comprising a base, selected edges of said base defining predetermined included configurations, a plurality of parallel channels in said base, an upstanding lug located on an edge of said base and between two of said channels, a screw in threaded engagement with said lug and passing therethrough, a vertical plate carried on the end of said screw, a horizontal plate on said vertical plate, stops engaged slidably in said channels and fixed to said vertical plate, and a clamping element depending from said horizontal plate.

22. A fixture comprising a base, selected edges of said base defining predetermined included configurations, a plurality of parallel channels in said base, a vertical lug fixed to an edge of said base and between two of said channels, said lug having a threaded bore, a screw in said bore, said screw extending parallel said channels, a vertical plate carried on the end of said screw, said screw being rotatable freely in said vertical plate, stops engaged slidably in said channels, said stops being fixed to said vertical plate, a horizontal plate on said vertical plate, said horizontal plate having a vertical threaded bore, a screw in said bore, said screw having a clamping surface at its lower end, and channels in the nether portions of selected edges of said base.

23. A fixture comprising a base, selected edges of said base defining predetermined included configurations, a plurality of parallel channels in said base, an upstanding lug located on an edge of said base and between two of said channels, a screw in threaded engagement with said lug and passing therethrough, a first plate disposed at an angle to said base and carried on the end of said screw, a second plate disposed at an angle to said first plate and secured thereto, stops engaged slidably in said channels and fixed to said first plate, and a clamping element depending from said second plate.

24. A fixture comprising a base, selected edges of said base defining predetermined included configurations, a plurality of parallel channels in said base, a vertical lug fixed to an edge of said base and between two of said channels, said lug having a threaded bore, a screw in said bore, said screw extending parallel said channels, a first plate disposed at an angle to said base and carried on the end of said screw, said screw being rotatable freely in said first plate, stops engaged slidably in said channels, said stops being fixed to said first plate, a second plate mounted on said first plate at an angle thereto, said second plate having a threaded bore, a screw in said bore, said screw having a clamping surface at its lower end, and channels in the nether portions of selected edges of said base.

25. A fixture comprising a base, selected edges of said base defining predetermined included configurations, a plurality of parallel channels in said base, an upstanding lug located on an edge of said base and between two of said channels, a screw in threaded engagement with said lug and passing therethrough, a first plate disposed at an angle to said base and carried on the end of said screw, a second plate disposed at an angle to said first plate and secured thereto, a stop engaged slidably in at least one of said channels and fixed to said first plate, and a clamping element depending from said second plate.

26. A fixture comprising a base, selected edges of said base defining predetermined included configurations, a plurality of parallel channels in said base, a vertical lug fixed to an edge of said base and between two of said channels, said lug having a threaded bore, a screw in said bore, said screw extending parallel said channels, a first plate disposed at an angle to said base and carried on the end of said screw, said screw being rotatable freely in said first plate, a stop in at least one of said channels and fixed to said first plate, a second plate mounted on said first plate at an angle thereto, said second plate having a threaded bore, a screw in said bore, said screw having a clamping surface at its lower end, and channels in the nether portions of selected edges of said base.

AUBREY C. TUCKER.

REFERENCES CITED

The following references are of record in the file of this patent:

UNITED STATES PATENTS

| Number | Name | Date |
|---|---|---|
| 975,966 | Lilljiquist | Nov. 15, 1910 |
| 1,038,544 | Ensign | Sept. 17, 1912 |
| 1,231,238 | Carter | June 26, 1917 |
| 1,625,049 | Oliver | Apr. 19, 1927 |
| 1,979,637 | O'Neill | Nov. 6, 1934 |
| 2,225,806 | Stone | Dec. 24, 1940 |
| 2,394,242 | Jearum | Feb. 5, 1946 |